(12) United States Patent
Bonnel

(10) Patent No.: US 9,609,979 B2
(45) Date of Patent: Apr. 4, 2017

(54) KITCHENWARE ITEM WITH A HANDLE WHICH WORKS WITH A COVER

(75) Inventor: Jocelyn Bonnel, Vions (FR)

(73) Assignee: SEB S.A., Ecully (FR)

( * ) Notice: Subject to any disclaimer, the term of this patent is extended or adjusted under 35 U.S.C. 154(b) by 754 days.

(21) Appl. No.: 14/131,806

(22) PCT Filed: Jul. 5, 2012

(86) PCT No.: PCT/FR2012/051579
§ 371 (c)(1),
(2), (4) Date: Apr. 17, 2014

(87) PCT Pub. No.: WO2013/007929
PCT Pub. Date: Jan. 17, 2013

(65) Prior Publication Data
US 2014/0217104 A1  Aug. 7, 2014

(30) Foreign Application Priority Data
Jul. 13, 2011  (FR) ...................................... 11 56364

(51) Int. Cl.
*A47J 36/12*  (2006.01)
*A47J 36/16*  (2006.01)

(52) U.S. Cl.
CPC ............. *A47J 36/12* (2013.01); *A47J 36/165* (2013.01)

(58) Field of Classification Search
CPC ................................ A47J 36/12; A47J 36/165
USPC .......... 220/366.1, 756, 379, 744, 832, 573.1; 335/220
See application file for complete search history.

(56) References Cited

U.S. PATENT DOCUMENTS

2005/0184079 A1  8/2005  Wade et al.
2006/0278095 A1  12/2006  Saunders et al.

FOREIGN PATENT DOCUMENTS

EP  1369072 A1  2/2007

*Primary Examiner* — Stephen Castellano
(74) *Attorney, Agent, or Firm* — The Webb Law Firm

(57) ABSTRACT

Provided is a kitchenware item comprising a pan provided with a side wall, a cover suitable for covering the pan and a handle comprising attachment means for attaching to the side wall. The handle comprises an electrical energy source, and an electromechanical device fed by the electrical energy source and controlled by control means, and the electromechanical device is suitable for driving an actuating device that acts on the cover in order to move same.

7 Claims, 3 Drawing Sheets

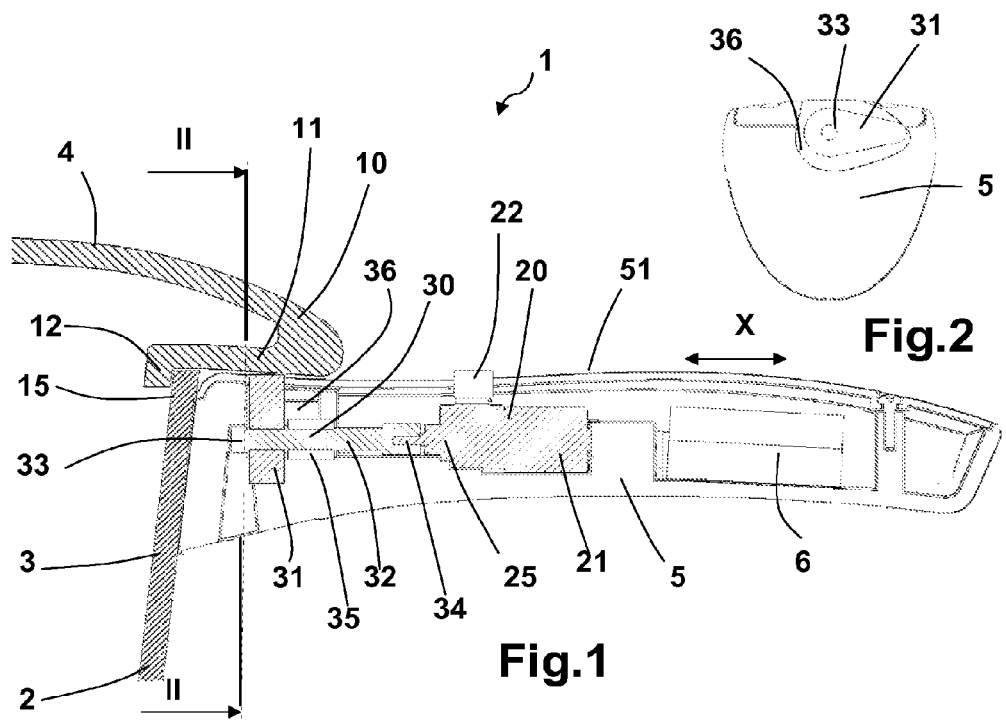
Fig.2
Fig.1
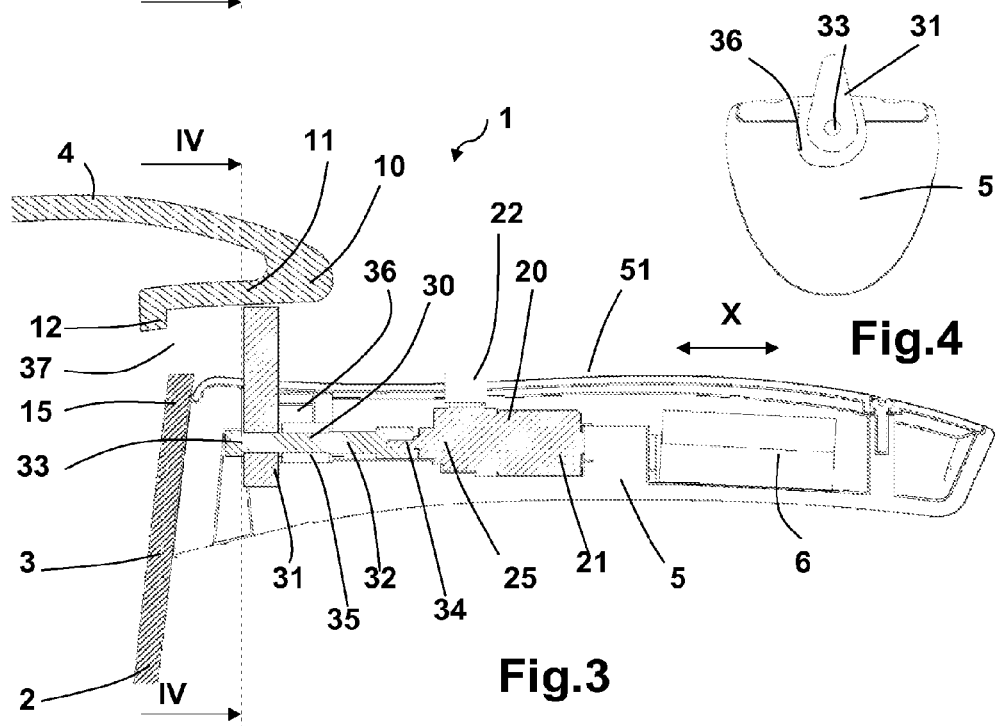
Fig.4
Fig.3

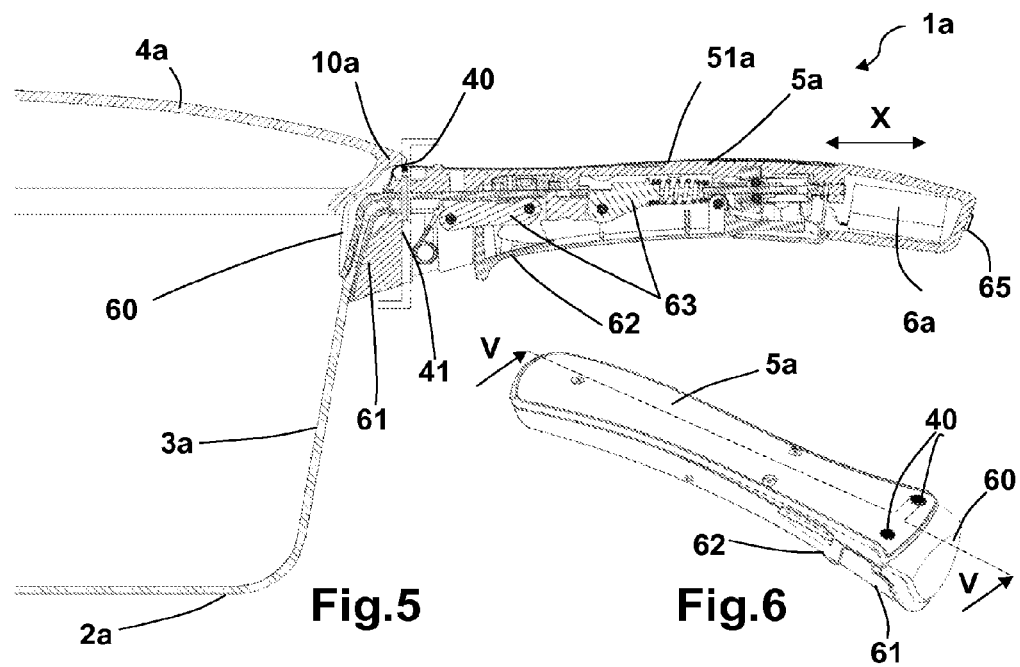
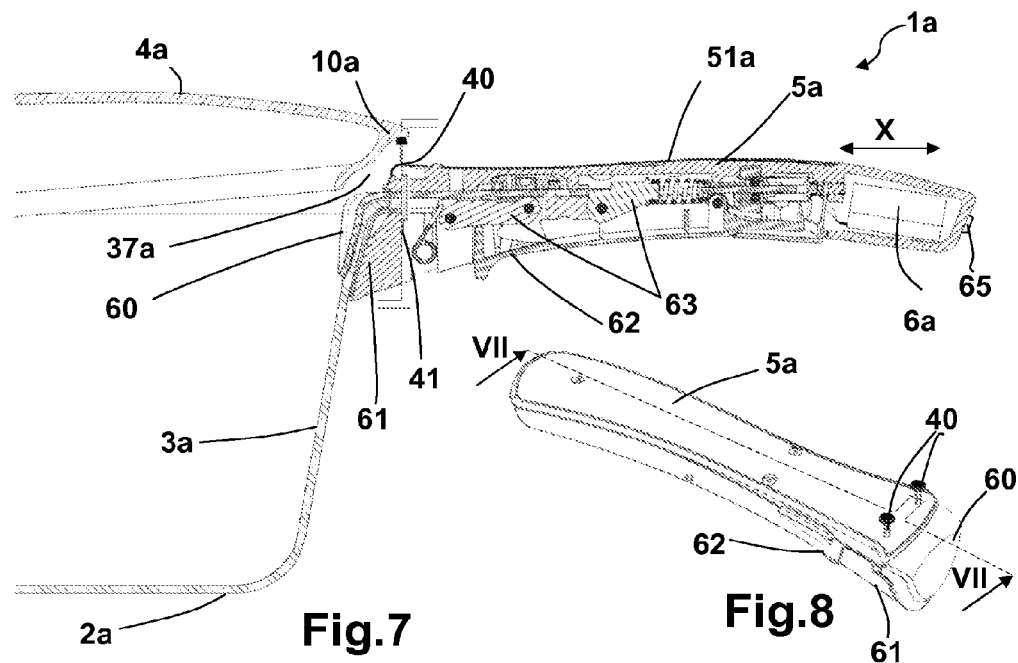

KITCHENWARE ITEM WITH A HANDLE WHICH WORKS WITH A COVER

CROSS-REFERENCE TO RELATED APPLICATIONS

This application is the United States national phase of International Application No. PCT/FR2012/051579 filed Jul. 5, 2012, and claims priority to French Patent Application No. 11 56364 filed Jul. 13, 2011, the disclosures of which are hereby incorporated in their entirety by reference.

BACKGROUND OF THE INVENTION

Field of the Invention

This invention concerns a kitchenware item designed to cook food, in particular, a frying pan, casserole, sautéing pan, stewpot or pressure cooker with a handle and cover.

Description of Related Art

Document CH686338 describes a kitchenware item with a cover with a motor powered by a battery and an agitator which is rotated by the motor to mix the food. Such an arrangement automates the shaking function using a motor and battery to assist the user.

However, a kitchenware item with such a cover does not allow the user to easily monitor how the food is cooking. The weight of the cover is increased by the weight of the motor and battery and, as a result, it is difficult to move. Further, the motor and battery protrude from the upper portion of the cover which complicates storage of the kitchenware item with a cover.

The purpose of this invention is to eliminate the aforementioned inconvenience and offer a kitchenware item with a cover which is ergonomically optimized to allow the user to easily and safely handle it.

Another purpose of the invention is to offer a kitchenware item with a cover which can be easily stored.

Another purpose of the invention is to offer a kitchenware item with a cover with a simple design which is easy to use.

SUMMARY OF THE INVENTION

These purposes are achieved with a kitchenware item with a pan with a lateral face or side wall, a cover designed to cover the pan and a handle with an attachment mechanism to attach it to the lateral face, wherein said handle contains an electrical energy source, an electromechanical mechanism powered by the energy source which is controlled by a control mechanism and wherein the electromechanical mechanism is designed to activate a trigger mechanism which moves the cover.

Such an arrangement allows a kitchenware item with a cover which offers mechanized functions to the user to use the cover. The heavy, bulky components, which mechanize the functions, i.e., the energy source, electromechanical mechanism and trigger mechanism are located in the handle. This does not increase the cover's weight and does not protrude. Therefore, the cover remains easy to use and store. Further, the positioning of the heavy components in the handle improves ergonomics by shifting the center of gravity toward the handle held by the user.

Advantageously, the trigger mechanism contains a lever which moves from a rest position in which the lever is located within the handle and an activated position in which the lever projects from the upper face of the handle to raise the cover placed on the cap, thereby controlling the flow of steam when food is heated in the cap.

This arrangement allows the steam release mechanism to be mechanized.

Using the control mechanism located on the handle, the user may easily control the release of steam without touching the cover, thereby not risking a burn.

Preferably, the lever consists of a rotating cam.

This arrangement creates a mobile lever which is simple and easy to use.

Advantageously, the lever consists of at least one, movable piston.

Preferably, the cover contains a ring-shaped trammel and the trigger mechanism contains a cog rotated by the electromechanical mechanism where said cog works with a trammel to rotate the cover on the cap.

This arrangement allows for a cover which rotates on the very light pan, which is easy to move and store.

Advantageously, the cover contains a mechanism to shake or grind the food located in the pan where said shaking or grinding mechanism acts on the food when the cover is rotated on the pan.

This arrangement mechanizes the shaking or grinding of the food located in the pan.

Preferably, the shaking mechanism includes a mixing paddle.

Advantageously, the electromechanical mechanism contains a motor to activate the trigger mechanism.

This arrangement makes activating the trigger mechanism very easy.

Preferably, the electrical energy source is a rechargeable electrical energy source designed to be recharged by a recharger.

This arrangement creates independence sufficient to mechanize the planned functions.

Advantageously, the handle attachment mechanism can be detached so that said handle can be attached to and removed from the lateral face.

This arrangement improves the storing of the kitchenware item and also facilitates battery recharging since the handle and battery can be placed on a recharging base once detached from the kitchenware item.

Preferably, the kitchenware item is a frying pan, casserole, sautéing pan or stewpot.

DESCRIPTION OF THE INVENTION

The invention will be better understood by viewing the methods of implementation, which are in no way limitative, shown in the attached drawings in which:

FIG. 1 shows a partial cut-away view of a kitchenware item and a cover in accordance with one method of implementation of the invention.

FIG. 2 shows a schematic view of the handle of the kitchenware item along line II-II shown in Diagram 1.

FIG. 3 shows a partial schematic cut-away view of the kitchenware item in Diagram 1 with the cover raised.

FIG. 4 shows a schematic view of the handle of the kitchenware item along line IV-IV shown in Diagram 3.

FIG. 5 shows a partial schematic cut-away view of a kitchenware item, cover and removable handle in accordance with a second method of implementation of the invention. The cut-away view of the handle is shown along line V-V shown in FIG. 6.

FIG. 6 shows a perspective view of the removable handle of the kitchenware item in FIG. 5.

FIG. 7 shows a partial schematic cut-away view of the kitchenware item, cover and removable handle in FIG. 5 with the cover raised. The cut-away view of the handle was prepared along line VII-VII shown in FIG. 8.

FIG. 8 shows a perspective view of the removable handle of the kitchenware item in FIG. 7.

Figure 9:
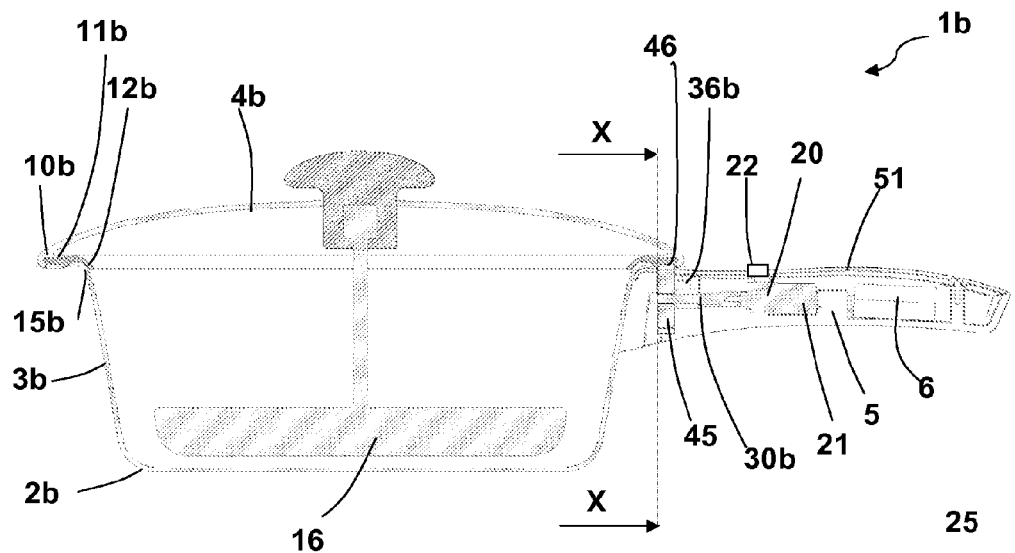

FIG. 9 shows a partial schematic cut-away view of a kitchenware item and a cover which is rotated in accordance with a third method of implementation of the invention.

Figure 10:
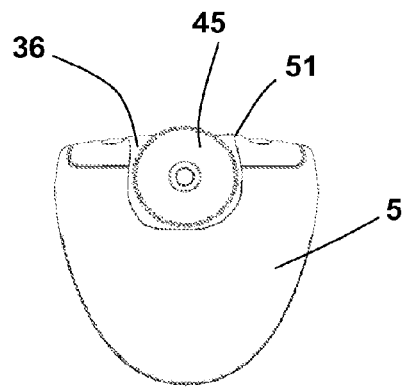

FIG. 10 shows a schematic view of the handle of the kitchenware item along line X-X shown in FIG. 9.

In accordance with an initial method of implementation shown in FIGS. 1 to 4, kitchenware item 1 includes sap-pan 2 with a side wall or lateral face 3, cover 4 designed to cover pan 2 and handle 5. Handle 5 is attached to lateral face 3 by the attachment mechanism (not shown in the drawings). The attachment mechanism may include a gudgeon attached to the pan which cooperates with a screw which is located in an opening in the handle.

Lateral face 3 includes an upper edge 15 on which cover 4 rests. Cover 4 contains exterior ledge 10 which extends radially beyond upper edge 15 which has fold 11 which forms a basically horizontal face. Ledge 10 of cover 4 contains positioning shoulder 12 on the upper edge.

Handle 5 is elongated and extends from lateral face 3 in longitudinal direction X. Handle 5 contains electrical energy source 6, electromechanical mechanism 20 powered by electrical energy source 6 which is controlled by the control mechanism and trigger mechanism 30 driven by electromechanical mechanism 20.

Trigger mechanism 30 contains a lever which forms rotatable cam 31 which is located in the front section of handle 5, under ledge 10 of cover 4, when it rests on man 2. Cam 31 is located in front section 33 of shaft 32 which is rotated by flat piece 35. Shaft 32 includes second section 34 which is rotated by the electromechanical mechanism driven by electrical motor 21.

Handle 5 contains upper face 51 under which housing 36 is located. Cam 31 is housed in housing 36 and is connected to the exterior by upper face 51 of handle 5. Cam 31 is rotated by electrical motor 21 to move between a rest position in which cam 31 is housed inside housing 36 (FIGS. 1 and 2) and an activated position in which cam 31 projects from upper face 51 of handle 5 (FIGS. 3 and 4). In the rest position, the principal axis of cam 31 is essentially parallel to the horizontal plane of handle 5. In the activated position, the principal axis of cam 31 is essentially perpendicular to the horizontal plane of handle 5 and is oriented upward when pan 2 is placed on a horizontal support.

In the activated position, cam 31 is supported on ledge 10 and cover 4 is raised in an inclined position to create space 37 through which steam may escape when food is heated in pan 2. When in the activated position space 37 is a maximum of 25 millimeters in size.

Preferably, cam 31 may occupy multiple intermediate positions between the rest and activated positions to that the user can adjust space 37 to the amount of steam produced.

Preferably, electrical motor 21 includes reduction gear 25. For example, the rotation speed of the electrical motor is designed to move the cam from the rest position to the activated position, i.e., 90°, in two seconds. The motor power should be approximately two watts.

Electrical energy source 6 may include a rechargeable electrical energy source (a large battery or super capacitor) or one or more small batteries. For example, the large battery could provide 3.6 volts and 780 mA/hour. Electrical energy source 6 may be removed and be recharged in a charger outside kitchenware item 1.

Preferably, cam 31 is located in the front section of handle 5 and electrical energy source 6 is located near the rear section of handle 5. The control mechanism, electromechanical mechanism 20 and trigger mechanism 30 are located between cam 31 and electrical energy source 6. Electromechanical mechanism 20, trigger mechanism 30 and electrical energy source 6 are essentially aligned in longitudinal direction (X) which allows for a compact handle 5 in a generally elongated shape to allow it to be grasped by a user to raise kitchenware item 1.

The control mechanism includes control button 22 which can be accessed from the exterior of handle 5 and an electronic circuit (not shown) connected to control button 22 and electromechanical mechanism 20. In the example in FIGS. 1 and 3, control button 22 is located on handle 5.

When the user presses control button 22, a signal is transmitted to the electronic circuit which orders electrical motor 21 to rotate.

Control button 22 has three positions: a stable rest position, a more forward position to select an initial rotation direction for electrical motor 21 to open cover 4 and a second rotation direction to close cover 4.

In operation, the user places the food to be cooked in kitchenware item 1 and, to cook it, he places kitchenware item 1 on a heat source. He grasps cover 4 and positions exterior ledge 10 on upper edge 15. Cam 31 remains within handle 5. Once the food has started to cook and the user would like release steam, he activates electrical motor 21 by pressing control button 22. Accordingly, cam 31 is rotated is supported on ledge 10 to raise cover 4. Space 37, through which the steam may escape, is created. Depending on cooking progress and the adjustment of the heat source, the user may modulate the release of the steam by adjusting the position of cam 31 between the activated position in which space 37 is at a maximum and the rest position in which space 37 is at a minimum.

In one method of implementation shown to FIGS. 5 to 8, kitchenware item 1a includes pan 2a with lateral face 3a, cover 4a designed to cover pan 2a and handle 5a. Handle 5a contains a detachable attachment mechanism to attach said handle 5a to and remove it from lateral face 3a. The attachment mechanism includes two jaws 60 and 61 which form a pincer of which jaw 60 moves in relation to the other jaw 61 between an open and a closed position in which the two jaws 60 and 61 form a pincer which grasps lateral face 3a of kitchenware item 1a. The attachment mechanism also includes a movement mechanism designed to move jaws 60 and 61, which form a pincer between the open and closed positions. The movement mechanism includes lever 62 mounted to pivot on handle 5a between a remote position and a retracted position inside handle 5a. A set of rods 63 is designed to move mobile jaws 60 when lever 62 is manually pivoted by the user. Such a removable handle is described in more detail in document FR 2 898 031.

In this method of implementation, handle 5a includes trigger mechanism 30a which also allows cover 4a placed on pan 2a to be raised. Trigger mechanism 30a includes a lever driven by two pistons 40, each activated by motor 41. Motor 41 contains a screw/nut system (not shown in drawings). The nut is rotated and acts using the screw on piston 40. These motors 41 are powered by energy source 6a housed in grasp body 50a of handle 5a.

Pistons 40 move perpendicularly to longitudinal direction (X) between a rest position (FIGS. 5 and 6) in which they are retracted (in full or nearly so) within the grasp body 50a and an activated position (FIGS. 7 and 8) in which they protrude from upper face 51a of the handle and are generally perpendicularly to it. Pistons 40 are aligned along the edge in front of the grasp mechanism in a direction perpendicular to longitudinal direction (X).

Handle 5a grasps lateral face 3a of pan 2a from the top of the lateral face. As shown in FIG. 5, when pistons 40 are in the rest position (retracted), cover 4a is shaped to rest on pistons 40 and cover mobile jaws 60 to leave as little space as possible between cover 4a and handle 5a. Cover 4a includes support ledge 10 which rests on its external periphery and which supports pistons 40. When pistons 40 are in the activated position (FIGS. 7 and 8), they are in contact with support ledge 10 support of cover 4a and pushes the cover up to form space 37a between cover 4a and mobile jaws 60 of handle 5a. Therefore, space 37a created between cover 4a and the upper ledge of pan 2a to allow the steam to be released.

In one variation, the pistons may be activated by a electromagnet, in particular, a "push" type electromagnet which includes a cylindrical body and a coil moves a metallic stem.

If a rechargeable electrical energy source is used, handle 5a includes an electrical connection mechanism accessible from the outside of the handle to allow rechargeable electrical energy source 6a to be recharged. The electrical connection mechanism may include two electrical connection terminals 65 connected to rechargeable electrical energy source 6a. The electrical connection terminals 65 may be connected to and disconnected from the two electrical connection terminals provided on a recharging base to allow electrical energy source 6 to be recharged. The terminals of electrical connection 65 are located on the back of handle 5a.

In one variation, the control mechanism includes a mechanism to detect the presence of steam in the cap to operate the trigger mechanism. This variation allows the steam release function to be automated, reducing the attention required to cook food in the kitchenware item. For example, the risk of overflow may be eliminated when cooking pasta if the boiling is not being monitored. For example, the detection means could include a temperature sensor which would detect boiling water, an optical sensor or an electrical sensor with capacity electrodes.

In another method of implementation shown in FIGS. 9 and 10, kitchenware item 1b includes pan 2b with lateral face 3b and cover 4b designed to cover pan 2b and handle 5. Lateral face 3b includes upper edge 15b on which cover 4b rests. Cover 4b contains exterior ledge 10b which extends radially beyond upper edge 15b which has fold 11b which forms an essentially horizontal face. Ledge 10b of cover 4b contains positioning shoulder 12b on the upper edge.

Trigger mechanism 30b contains cog 45 which is rotated by electromechanical mechanism 20. Cog 45 is located in the initial section of handle 5, under ledge 10b of cover 4 b when it rests on pan 2b.

Cog 45 forms part of the initial section of the shaft. The cog is housed in housing 36b in handle 5. Housing 36b is connected to the exterior by upper face 51 of handle 5. Cog 45 partially projects from upper face 51 and is rotated by electrical motor 21 to drive trammel 46 located on ledge 10b of cover 4b. Trammel 46 rotates cover 4b on pan 2b. Shoulder 12b guides cover 4b on upper edge 15b. For example, the motor rotation speed is designed to cause the cover to rotate at approximately fifteen rotations per minute. Cover rotation speed may be adjustable.

In one variation, trammel 46 and shoulder 12b are made of a single injection molded plastic piece to make them slippery to reduce the wear and tear of cover 4b on lateral face 3b. Plastic is also resistant to temperature and may be, inter alia, a polyamide, polytetrafluoroethylene or polysulfide. This piece may be removable to be changed.

Cover 4b contains paddle 16 to mix the food (for example, purée, fried vegetables or soup) located at the bottom of sap-pan 2b. Paddle 16 could be assembled on the cover using an attachment mechanism to allow the user to remove the paddle to, for example, make washing easier. The paddle may be soft and folded in the cover. The paddle may have various forms depending on the type of preparation. For example, the paddle could contain a vertical face with a fold on the lower section to return the food during mixing or the paddles could have a perforated face for sauces and soups.

In one completion variation, the cover contains means to grind the food. The grinding means may include a perforated paddle which is inclined in the food in relation to the bottom of the cap. In this method of implementation, the cover contains mechanisms in the cap which only allow rotation.

Of course, the invention is not in any manner limited to the methods of implementation described and shown which have been provided only as examples. Modifications are possible, in particular, from the point of view of creating other items or replacement with equivalent techniques, without, however, falling outside the scope of protection of the invention.

Accordingly, in one variation of implementation, cover 4 has a transparent section to allow the user to monitor cooking without touching the cover.

The invention claimed is:

1. A kitchenware item comprising a pan having a sidewall defining a lateral face, a cover designed to cover the pan and a handle, including an attachment mechanism to attach the handle to the lateral face, where said handle has an electrical energy source and an electromechanical mechanism powered by the electrical energy source and controlled by a control mechanism and an electromechanical mechanism which are designed to be activated by a trigger mechanism, which moves the cover, wherein the trigger mechanism contains a mobile lever between a rest position in which the lever is inside the handle and an activated position in which the lever protrudes from an upper face of the handle to raise the cover placed on the pan, thereby controlling a rate of steam when food is heated in the pan.

2. The kitchenware item in accordance with claim 1, wherein the lever consists of a mobile, rotating cam.

3. The kitchenware item in accordance with claim 2, wherein the lever consists of at least one, mobile piston.

4. The kitchenware item in accordance with claim 1, wherein the electromechanical mechanism contains a motor to activate the trigger mechanism.

5. The kitchenware item in accordance with claim 1, wherein the electrical energy source is a rechargeable electrical energy source, designed to be recharged by a charger.

6. The kitchenware item in accordance with claim 1, where the handle attachment mechanism can be detached to attach said handle to, and remove it from, the lateral face.

7. The kitchenware item in accordance with claim 1, where the item is one of a frying pan, casserole, sautéing pan or stewpot.

* * * * *